United States Patent
Noh et al.

(10) Patent No.: US 11,911,777 B2
(45) Date of Patent: Feb. 27, 2024

(54) ELECTROSTATIC DUST COLLECTING APPARATUS AND METHOD OF MANUFACTURING THE SAME

(71) Applicant: SAMSUNG ELECTRONICS CO., LTD., Suwon-si (KR)

(72) Inventors: Hyongsoo Noh, Suwon-si (KR); Yasuhiko Kochiyama, Suwon-si (KR); Soyoung Yun, Suwon-si (KR); Hyewon Gil, Suwon-si (KR); Kyuho Shin, Suwon-si (KR); Joonoh Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 17/205,138

(22) Filed: Mar. 18, 2021

(65) Prior Publication Data

US 2021/0291199 A1    Sep. 23, 2021

(30) Foreign Application Priority Data

Mar. 18, 2020 (KR) .................. 10-2020-0033047
May 29, 2020 (KR) .................. 10-2020-0064817

(51) Int. Cl.
   *B03C 3/12*     (2006.01)
   *B03C 3/41*     (2006.01)
   (Continued)

(52) U.S. Cl.
   CPC ............ *B03C 3/12* (2013.01); *B03C 3/41* (2013.01); *B03C 3/47* (2013.01); *B03C 3/86* (2013.01);
   (Continued)

(58) Field of Classification Search
   CPC .... B03C 3/47; B03C 3/86; B03C 3/08; B03C 3/40
   See application file for complete search history.

(56) References Cited

U.S. PATENT DOCUMENTS 2,470,356 A * 5/1949 MacKenzie ............... B03C 3/40
                                                      96/87
2,488,712 A * 11/1949 Dahlman .................. B03C 3/86
                                                      96/86
(Continued)

FOREIGN PATENT DOCUMENTS

JP    05-261313 A    10/1993
JP    08-323237 A    12/1996
(Continued)

OTHER PUBLICATIONS

Korean Office Action dated Sep. 13, 2021 in Korean Patent Application No. 10-2020-0064817.
(Continued)

*Primary Examiner* — Christopher P Jones
*Assistant Examiner* — Sonji Turner
(74) *Attorney, Agent, or Firm* — STAAS & HALSEY LLP

(57) ABSTRACT

Provided is an electrostatic dust collecting apparatus including a first electrode, a second electrode spaced apart from the first electrode along a first direction, at least one support member configured to maintain an interval between the first electrode and the second electrode spaced apart from each other, and a support bar formed to extend along the first direction. The at least one support member each include at least one electrode insertion groove formed to allow at least one of the first electrode or the second electrode to be
(Continued)

inserted thereinto and a coupling hole extending along the first direction and formed to allow the support bar to be coupled thereto.

18 Claims, 28 Drawing Sheets

(51) Int. Cl.
  *B03C 3/47* (2006.01)
  *B32B 7/14* (2006.01)
  *B03C 3/86* (2006.01)
  *B32B 37/12* (2006.01)

(52) U.S. Cl.
  CPC ............ *B32B 7/14* (2013.01); *B32B 37/1292* (2013.01); *B03C 2201/04* (2013.01); *B32B 2457/00* (2013.01)

(56) References Cited

U.S. PATENT DOCUMENTS

| | | | | |
|---|---|---|---|---|
| 2,535,696 | A * | 12/1950 | Richardson | B03C 3/47 96/86 |
| 2,542,262 | A * | 2/1951 | Richardson | B03C 3/86 96/86 |
| 2,714,939 | A * | 8/1955 | Richardson | B03C 3/47 96/86 |
| 3,114,616 | A | 12/1963 | Palmore | |
| 3,175,341 | A * | 3/1965 | Winter | B03C 3/86 96/86 |
| 3,985,525 | A * | 10/1976 | Tomaides | B03C 3/86 96/79 |
| 4,325,714 | A * | 4/1982 | Wooldridge | B03C 3/86 96/86 |
| 4,332,597 | A * | 6/1982 | Wooldridge | B03C 3/86 96/54 |
| 5,248,324 | A | 9/1993 | Hara | |
| 9,795,971 | B2 * | 10/2017 | Shao | B03C 3/64 |
| 2015/0266033 | A1 | 9/2015 | Shao et al. | |
| 2017/0120257 | A1 | 5/2017 | Lee et al. | |

FOREIGN PATENT DOCUMENTS

| | | | |
|---|---|---|---|
| JP | 11-90265 | A | 4/1999 |
| JP | 11-253836 | A | 9/1999 |
| JP | 3440403 | B2 * | 8/2003 |
| JP | 2009-95799 | A | 5/2009 |
| JP | 4290242 | | 7/2009 |
| JP | 2009-226297 | A | 10/2009 |
| JP | 2019-177344 | | 10/2019 |
| JP | 2020-69446 | A | 5/2020 |
| JP | 2021-102185 | A | 7/2021 |
| KR | 10-2017-0103111 | | 9/2017 |
| KR | 10-2017-0136246 | A | 12/2017 |
| KR | 10-1860917 | | 7/2018 |
| KR | 10-2018-0101844 | A | 9/2018 |
| KR | 10-2019-0055906 | | 5/2019 |

OTHER PUBLICATIONS

Korean Notice of Allowance issue in Korean Application No. 10-2020-0064817 dated Mar. 18, 2022.
International Search Report dated Jun. 29, 2021 in corresponding PCT application No. PCT/KR2021/002986.
Extended European Search Report dated Dec. 12, 2022, in European Application No. 21770805.6.

* cited by examiner

ELECTROSTATIC DUST COLLECTING
APPARATUS AND METHOD OF
MANUFACTURING THE SAME

CROSS-REFERENCE TO RELATED
APPLICATION

This application is based on and claims priority under 35 U.S.C. § 119 to Korean Patent Applications Nos. 10-2020-0033047, filed on Mar. 18, 2020 and 10-2020-0064817, filed on May 29, 2020 in the Korean Intellectual Property Office, the disclosures of which are incorporated herein by reference.

BACKGROUND

1. Field

The disclosure relates to an electrostatic dust collecting apparatus, and more specifically, to an electrostatic dust collecting apparatus with an improved performance for dust collection.

2. Description of the Related Art

In a closed space, such as houses, rooms, shopping malls, factories, and offices, high concentration aerosols may have a negative effect on the health of people. The aerosol may be generated by smoking, cooking, cleaning, welding, grinding, etc. in a closed space.

An electrostatic dust collecting apparatus is an apparatus for removing such aerosols and may be used for an air cleaner or an air conditioner having an air cleaning function.

The electrostatic dust collecting apparatus may include a dust collecting unit having a high voltage electrode and a low voltage electrode, and require a spacer to separate the high voltage electrode from the low voltage electrode. The spacer allows the high-voltage electrode and the low-voltage electrode to be spaced at a uniform distance, so that the electrostatic dust collecting apparatus may stably implement the performance.

SUMMARY

According to an aspect of the disclosure, there is provided an electrostatic dust collecting apparatus including: a first electrode; a second electrode spaced apart from the first electrode along a first direction; at least one support member configured to maintain an interval between the first electrode and the second electrode spaced apart from each other; and a support bar formed to extend along the first direction, wherein the at least one support member each includes at least one electrode insertion groove formed to allow at least one of the first electrode or the second electrode to be inserted thereinto and a coupling hole extending along the first direction and formed to allow the support bar to be coupled thereto.

The at least one support member may each include a body formed with the coupling hole and an electrode insertion portion formed with the at least one electrode insertion groove.

The at least one support member may include a first support member into which the first electrode is inserted and a second support member into which the second electrode is inserted, and the first support member and the second support may be supported while in contact with each other along the first direction such that the first electrode and the second electrode are stacked along the first direction.

The at least one support member may be provided to surround opposite end portions of at least one of the first electrode or the second electrode along a short side of the at least one of the first electrode or the second electrode.

The at least one support member may each include a guide protrusion protruding from the electrode insertion portion along the first direction and a guide groove formed to correspond to the guide protrusion.

The guide protrusion may protrude from an upper portion of the electrode insertion portion, and the guide groove may be recessed from a lower portion of the electrode insertion portion.

The at least one support member may further include a first support member into which the first electrode is inserted and a second support member into which the second electrode is inserted, wherein the guide groove of the first support member and the guide protrusion of the second support member may be coupled to each other.

The at least one electrode insertion groove may include a first electrode insertion groove into which the first electrode is inserted and a second electrode insertion groove spaced apart from the first electrode insertion groove along the first direction and into which the second electrode is inserted.

The at least one support member may include a fixing device configured to fix at least one of the first electrode or the second electrode.

The fixing device may include at least one of a hook protruding from the electrode insertion groove toward the at least one electrode insertion groove or an adhesive member.

The hook may protrude from an upper portion of the electrode insertion portion.

The first electrode may be a high voltage electrode, and the second electrode is a low voltage electrode.

According to another aspect of the disclosure, there is provided an electrostatic dust collecting apparatus including: a charging unit; and a dust collecting unit installed downstream of the charging unit, wherein the duct collecting unit includes: a first electrode; a second electrode spaced apart from the first electrode; and a plurality of support members each including a bending portion configured to connect the first electrode to the second electrode while maintaining an interval between the first electrode and the second electrode spaced apart from each other, wherein the first electrode and the second electrode are arranged between the plurality of support members.

The first electrode and the second electrode may each be attached to the plurality of support members.

The plurality of support members may include a first support member attached to the first electrode and a second support member spaced apart from the first support member and attached to the second electrode.

The first electrode and the second electrode may each include opposite end portions along a short side thereof, and the first support member may be attached to one end portion of the first electrode and the second support member is attached to one end portion of the second electrode.

According to another aspect of the disclosure, there is provided a method of manufacturing an electrostatic dust collecting apparatus, the method including: alternately arranging a first electrode and a second electrode; coating a plurality of adhesive members on the first electrode and the second electrode to be spaced from each other; cutting regions of the plurality of adhesive members that are not coated on the first electrode and the second electrode; and stacking the first electrode and the second electrode.

The coating of the plurality of adhesive members may include spraying the plurality of adhesive members The first electrode may be a high voltage electrode, and the second electrode is a low voltage electrode.

The thicknesses of the plurality of adhesive member may be changed according to a speed of a transfer roller for transferring the first electrode and the second electrode.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
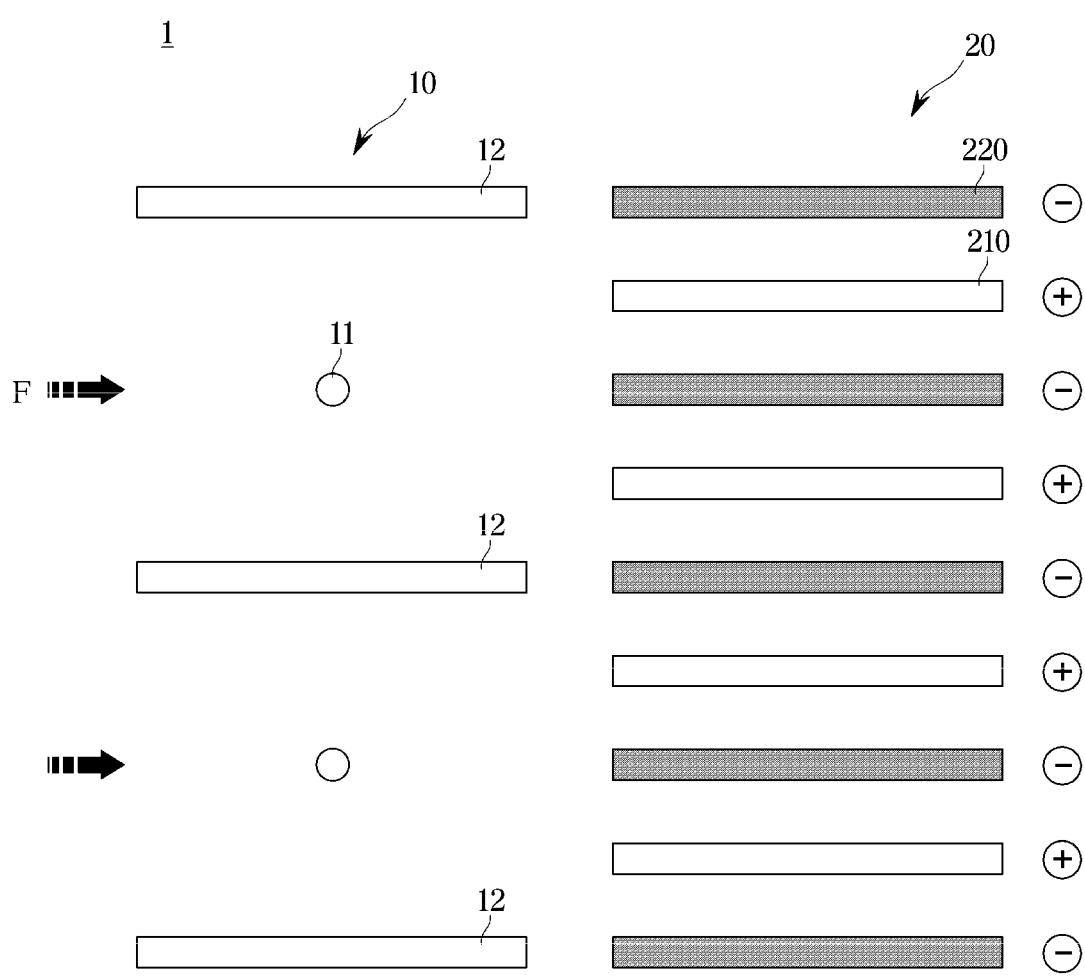
FIG. 1 is a schematic diagram illustrating an electrostatic dust collecting apparatus according to an embodiment of the disclosure.

The embodiments set forth herein and illustrated in the configuration of the disclosure are only the most preferred embodiments and are not representative of the full the technical spirit of the disclosure, so it should be understood that they may be replaced with various equivalents and modifications at the time of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~and/or~," or the like.

The terms "front", "rear", "upper", "lower", "top", and "bottom" as herein used are defined with respect to the drawings, but the terms may not restrict the shape and position of the respective components.

It is an object of the disclosure to provide an electrostatic dust collecting apparatus in which a sufficient distance between a high voltage electrode and a low voltage electrode is secured.

It is another object of the disclosure to provide an electrostatic dust collecting apparatus including a support member having a simple shape.

It is another object of the disclosure to provide an electrostatic dust collecting apparatus capable of reducing leakage of current, so that the output of a power supply device may be reduced.

It is another object of the disclosure to provide a method of manufacturing an electrostatic dust collecting apparatus that may simplify the manufacturing process and reducing the manufacturing cost.

Hereinafter, embodiments of the disclosure will be described in detail with reference to the accompanying drawings.

Figure 2:
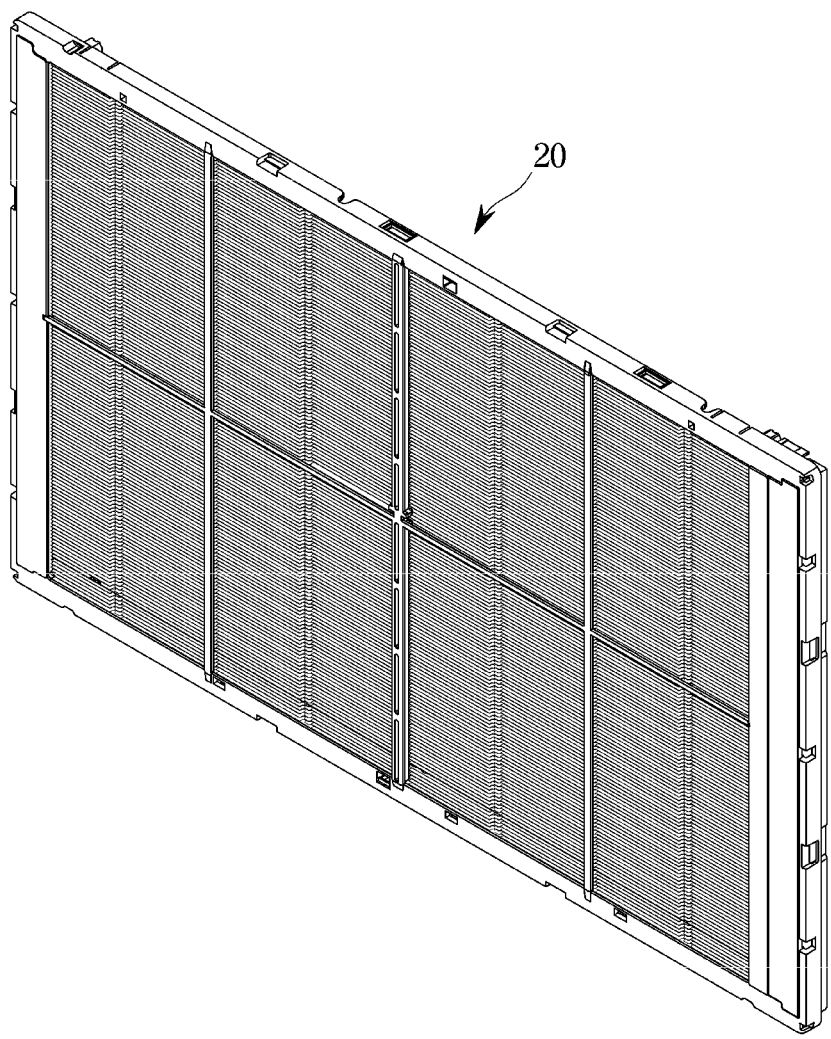
FIG. 2 is a view illustrating the electrostatic dust collecting apparatus according to the embodiment of the disclosure.
Figure 3:
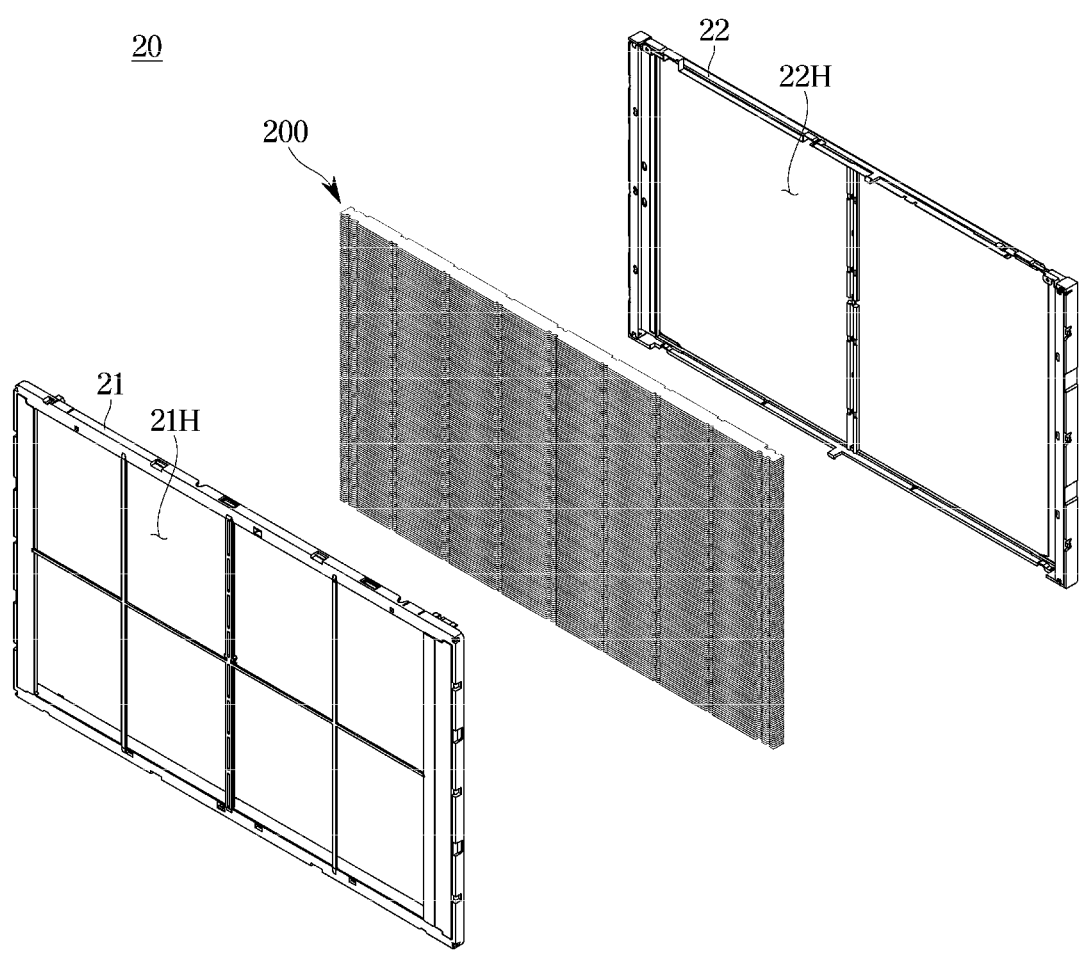
FIG. 3 is an exploded view illustrating the electrostatic dust collecting apparatus shown in FIG. 2.

FIG. 1 is a schematic diagram illustrating an electrostatic dust collecting apparatus according to an embodiment of the disclosure. FIG. 2 is a view illustrating the electrostatic dust collecting apparatus according to an embodiment of the disclosure. FIG. 3 is an exploded view illustrating the electrostatic dust collecting apparatus shown in FIG. 2.

Referring to FIGS. 1 to 3, an electrostatic dust collecting apparatus 1 may include a charging unit 10 and a dust collecting unit 20 installed downstream of the charging unit 10.

The electrostatic dust collecting apparatus 1 is provided to, through a blower fan (not shown) provided upstream or downstream of the electrostatic dust collecting apparatus 1, cause air introduced into the charging unit 10 along a direction F shown in FIG. 1 to pass through the collecting unit 20 and then flow to the outside again.

The charging unit 10 includes a discharge electrode 11 and a counter electrode 12 disposed between the discharge electrodes 11. The discharge electrode 11 is formed as a wire electrode installed between a pair of the counter electrodes 12, in general, as a tungsten wire.

In FIG. 1, for the sake of convenience of description, the discharge electrode 11 is illustrated as being disposed between a pair of the counter electrodes 12, but the charging unit may include a plurality of discharge electrodes and a plurality of counter electrodes alternately disposed between the plurality of discharge electrodes.

When a voltage is applied to the discharge electrode 11 (e.g., a voltage of 3 kV to 7 kV), the discharge electrode 11 and the counter electrode has corona discharge, which allows contaminants in the air to be charged with positive polarity (+) or negative polarity (−). For the sake of convenience of description, the following description will be made on an example that contaminants in the air passing through the charging unit 10 are charged with a positive polarity.

The dust collecting unit 20 has a structure in which a plurality of positive electrodes 210 in a plate shape and a plurality of negative electrodes 220 in a plate shape are stacked at regular intervals. For example, the positive electrode 210 and the negative electrode 220 may be formed by printing carbon ink on a surface of a laminated film or may be formed as a metal plate, such as an aluminum plate.

Accordingly, when a constant voltage is applied between the positive electrode 210 and the negative electrode 220 of the dust collecting unit 20, an electric field is formed between the positive electrode 210 and the negative electrode 220. Here, the positive electrode and the negative electrode are determined based on the potential difference between the two electrodes by referring a high-level electrode as a positive electrode and a low level electrode as a negative electrode. The positive electrode 210 may form a first electrode 210. The negative electrode 220 may form a second electrode 220.

Contaminants that are positively charged by passing through the charging unit 10 may be attached to the negative electrode 220 of the dust collecting unit 20 while passing through the dust collecting unit 20 disposed downstream of the charging unit 10. With such a configuration, contaminants in the air may be removed. Accordingly, the air passing through the dust collecting unit 20 may be discharged from the electrostatic dust collecting apparatus 1 in a clean state with pollutants removed therefrom.

The dust collecting unit 20 may include a dust collection sheet 200 and first and second covers 21 and 22 covering the dust collection sheet 200.

The first and second covers 21 and 22 may be provided in a frame shape surrounding the outer periphery of the dust collecting sheet 200, and have openings 21H and 22H at an inner side thereof so that air passing through the charging unit 10 passes through the dust collecting sheet 200.

A power connection member (not shown) connected to the dust collecting sheet 200 and applying power to the dust collecting sheet 200 may be disposed on the first and second covers 21 and 22.

The dust collecting sheet 200 may include a plurality of electrodes stacked one on top of each other.

Figure 4:
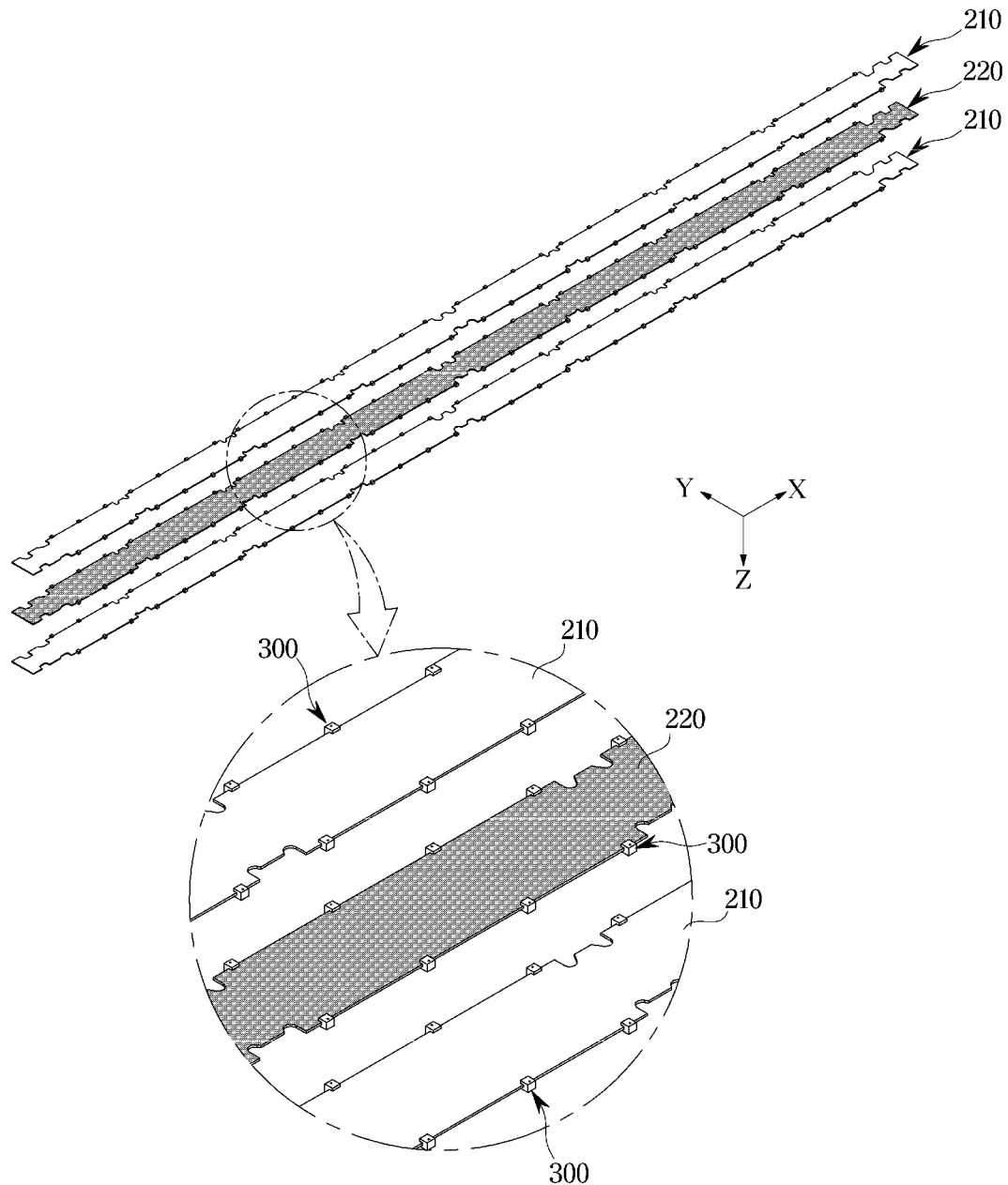
FIG. 4 is a diagram illustrating a first electrode and a second electrode of the electrostatic dust collecting apparatus shown in FIG. 2.
Figure 5A:
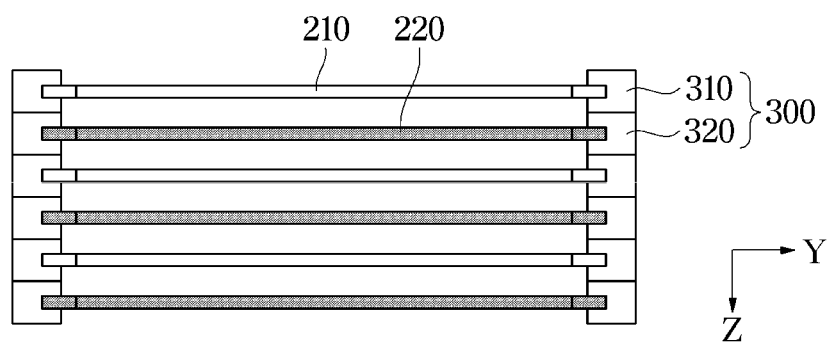
FIG. 5A is a cross-sectional view illustrating the electrostatic dust collecting apparatus shown in FIG. 4 when viewed in the X direction.
Figure 5B:
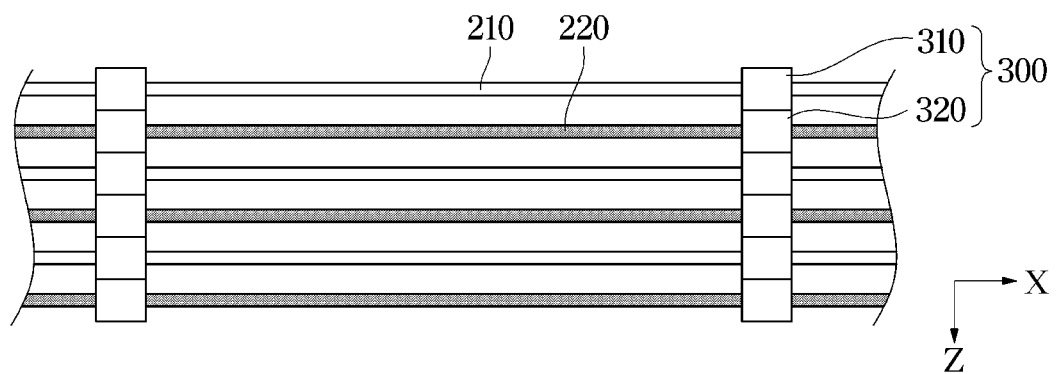
FIG. 5B is a cross-sectional view illustrating the electrostatic dust collecting apparatus shown in FIG. 4 when viewed in the Y direction.

FIG. 4 is a diagram illustrating first and second electrodes of the electrostatic dust collecting apparatus shown in FIG. 2. FIG. 5A is a view showing a cross-section of the electrostatic dust collecting apparatus shown in FIG. 4 when viewed in the X direction. FIG. 5B is a view showing a cross-section of the electrostatic dust collecting apparatus shown in FIG. 4 when viewed in the Y direction.

Referring to FIGS. 4 and 5, the first electrode 210 may be disposed on the upper side, and the second electrode 220 may be disposed on the lower side. A support member 300 may be disposed between the first electrode 210 and the second electrode 220. The support member 300 may be disposed to maintain an interval between the first electrode 210 and the second electrode 220.

The support member 300 may be provided in at least one unit thereof. The support member 300 may be provided to surround each of opposite end portions of the first electrode 210 and the second electrode 220 along the short side of the first electrode 210 and the second electrode 220. That is, the support member 300 may be disposed to surround opposite end portions of the first electrode 210 and the second electrode 220 along the Y direction. Therefore, the electrodes 210 and 220 and the support member 300 are not easily separated from each other and may be firmly coupled to each other.

The at least one support member 300 may be disposed to be spaced apart from each other.

The support member 300 may be formed of an insulating material. As such, since the interval between the first electrode 210 and the second electrode 220 is secured by the insulating material, insulation breakdown may be prevented.

The support member 300 may include a first support member 310 and a second support member 320. The first support member 310 may be formed to allow the first electrode 210 to be inserted thereinto. The second support member 320 may be formed to allow the second electrode 220 to be inserted thereinto.

Each of the first support member 310 and the second support member 320 may be provided in plural.

The plurality of first support members 310 may be disposed to be spaced apart from each other in the X direction. That is, the plurality of first support members 310 may be coupled to the first electrodes 210 while being spaced apart from each other along the X direction. The plurality of second support members 320 are also disposed to be spaced apart from each other along the X direction, and may be coupled to the second electrodes 220.

The first support member 310 and the second support member 320 may be supported by and come in contact with each other such that the first electrode 210 and the second electrode 220 are stacked one on top of each other along the Z direction. That is, the lower surface of the first support member 310 and the upper surface of the second support member 320 may come in contact with other, and the lower surface of the second support member 320 and the upper surface of another first support member 310 among the plurality of first support members 310 may come in contact with each other.

Air for removing aerosol may pass through a region between the first electrode 210 and the second electrode 220 along the Y direction.

Figure 6A:
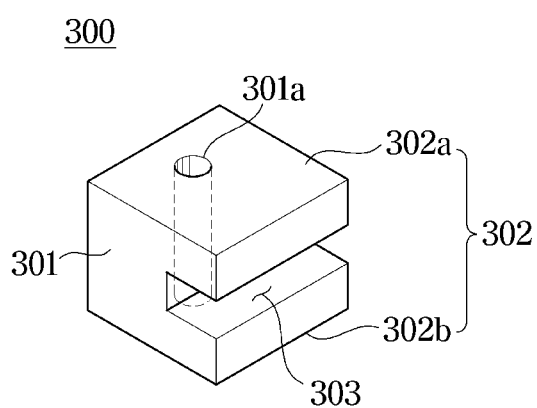
FIG. 6A is a view illustrating a support member of the electrostatic dust collecting apparatus shown in FIG. 2.
Figure 6B:
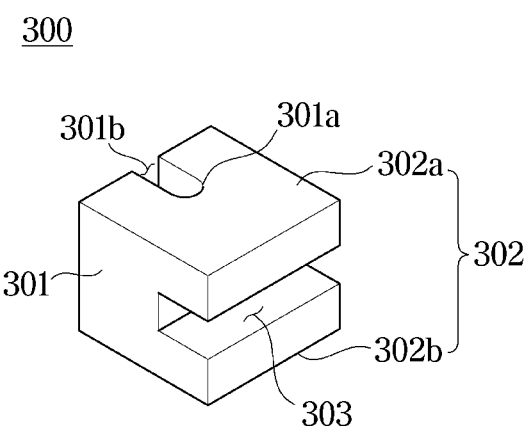
FIG. 6B is a view illustrating a support member of an electrostatic dust collecting apparatus according to another embodiment of the disclosure.
Figure 7A:
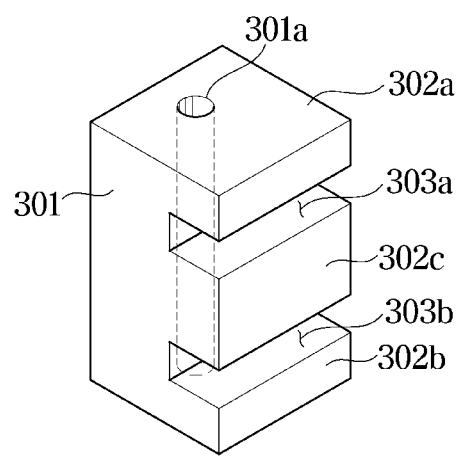
FIG. 7A is a view showing a support member of an electric precipitator according to still another embodiment of the disclosure.
Figure 7B:
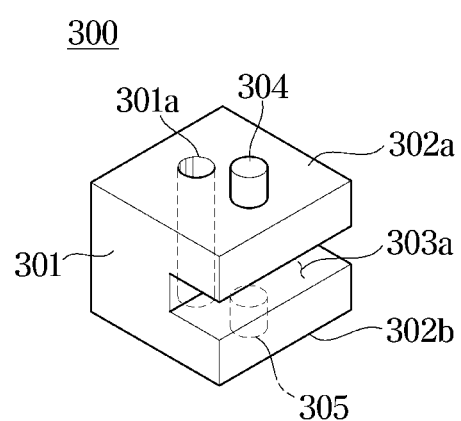
FIG. 7B is a view showing a support member of an electric precipitator according to still another embodiment of the disclosure.

FIG. 6A is a view illustrating a support member of the electrostatic dust collecting apparatus shown in FIG. 2. FIG. 6B is a view illustrating a support member of an electrostatic dust collecting apparatus according to another embodiment of the disclosure. FIG. 7A is a view showing a support member of an electric precipitator according to still another embodiment of the disclosure.

Referring to FIGS. 6A, 6B, 7A, and 7B, the support member may include a body 301 and an electrode insertion portion 302.

The body 301 may include a coupling hole 301a formed to be coupled to a support rod 330. The coupling hole 301a may pass through the body 301 along the Z direction. Therefore, the support rod 330, which will be described below, may be coupled to the coupling hole 301a of the at least one support member 300 to thereby connect the support rod 330 to the first electrode 210 and the second electrode 220. The coupling hole 301a is illustrated in a cylindrical shape, but is not limited thereto, and may be formed corresponding to the shape of the support rod 330. Therefore, the coupling hole 301a may include other various shapes than a cylindrical shape as long as it can be coupled to the support rod 330.

Referring to FIG. 5B, the body 301 may further include a fitting hole 301b connecting to the coupling hole 301a. The fitting hole 301b may be formed to allow the support rod 330 to be coupled to the coupling hole 301a therethrough. That is, the support rod 330 may be fitted into the fitting hole 301b.

Due to the coupling hole and the support rod, the at least one support member and the electrodes may be stably stacked, and the process may be simplified so that the manufacturing cost may be reduced The electrode insertion portion 302 may include an upper portion 302a, a lower portion 302b, and an electrode insertion groove 303.

The upper portion 302a and the lower portion 302b may formed to protrude from the body 301 along the Y direction. The electrode insertion groove 303 may be provided between the upper portion 302a and the lower portion 302b. The electrode insertion groove 303 may be formed to allow the first electrode 210 or the second electrode 220 to be insertedly fitted thereto. In the drawing, the electrode insertion groove 303 is illustrated in a quadrangular shape, but is not limited thereto and may be formed to correspond to the shape of the end portion of the electrode. Thus, the electrode insertion groove 303 may also include a rounded shape. In addition, the position of the electrode insertion groove 303 is illustrated in the middle between the upper portion 302a and the lower portion 302b, but is not limited thereto, and the electrode insertion groove 303 may be formed at a side adjacent to the upper portion 302a or the lower portion 302b.

Each of the support members 300 may further include a fixing device 306 for fixing the electrode inserted thereinto. The fixing device 306 may further include an adhesive member 306a and a hook 306b. Due to the fixing device 306, the coupling between the electrode and the support member 300 may be prevented from being easily release.

The adhesive member 306a may be formed on a surface adjacent to the electrode insertion groove 303 in the electrode insertion portion 302. The adhesive member 306a may be formed in a shape corresponding to the electrode insertion groove 303. That is, the adhesive member 306a may be disposed at a portion of the electrode insertion portion 302 that comes in contact with the electrode.

The hook 306b may protrude in a direction toward the electrode insertion groove 303 from the upper portion 302a or the lower portion 302b of the electrode insertion portion 302. In the drawing, the hook 306b is illustrated as protruding from the upper portion 302a along the Z direction, but is not limited thereto and may protrude from the lower portion 302b along the Z direction. When the hook 306b is formed on the support member 300, the first electrode 210 and the second electrode 220 may be formed with a groove in a shape corresponding to the hook 306b. The shape of the hook 306b is not limited to that shown in the drawing, and may include various shapes.

Figure 8A:
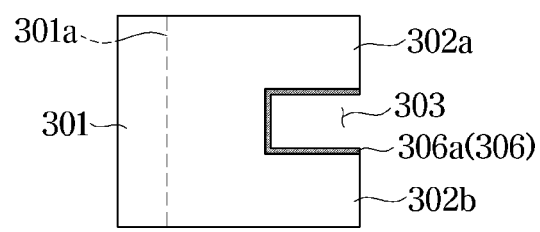
FIG. 8A is a view showing a support member of an electric precipitator according to still another embodiment of the disclosure.
Figure 8B:
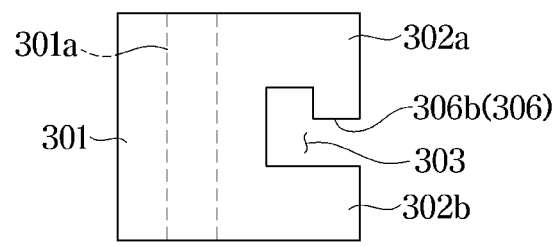
FIG. 8B is a view showing a support member of an electric precipitator according to still another embodiment of the disclosure.
Figure 9A:
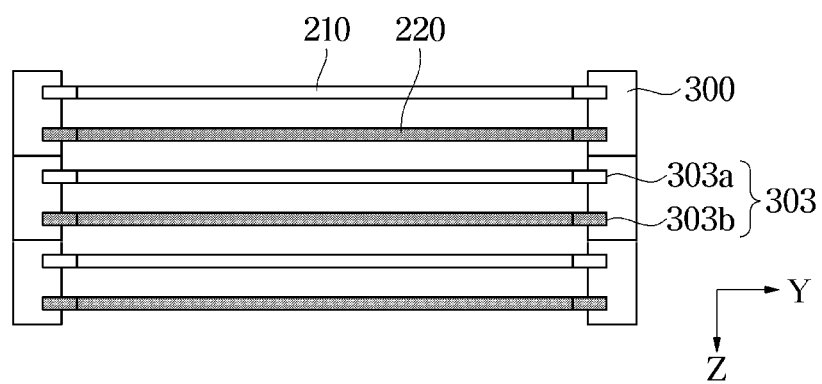
FIG. 9A is a cross sectional view illustrating the electrostatic dust collecting apparatus shown in FIG. 8A, when viewed in the X direction.
Figure 9B:
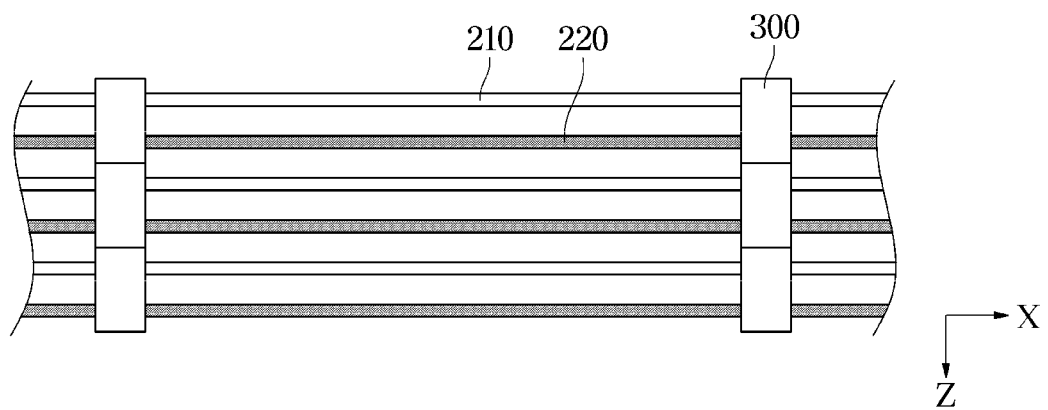
FIG. 9B is a cross sectional view illustrating the electrostatic dust collecting apparatus shown in FIG. 8A, when viewed in the Y direction.

FIG. 8B is a view showing a support member of an electric precipitator according to still another embodiment of the disclosure. FIG. 9A is a view showing a cross section of the electrostatic dust collecting apparatus shown in FIG. 8A, when viewed in the X direction. FIG. 9B is a view showing a cross section of the electrostatic dust collecting apparatus shown in FIG. 8A, when viewed in the Y direction.

Referring to FIGS. 8 and 9, the electrode insertion groove 303 may be formed in at least one unit thereof. That is, the at least one electrode insertion groove 303 may include a first electrode insertion groove 303a and a second electrode insertion groove 303b. The first electrode insertion groove 303a and the second electrode insertion groove 303b may each be coupled to the first electrode 210 or the second electrode 220. For example, the first electrode 210 may be inserted into the first electrode insertion groove 303a, and the second electrode 220 may be inserted into the second electrode insertion groove 303b. Conversely, the first electrode 210 may be inserted into the second electrode insertion groove 303b, and the second electrode 220 may be inserted into the first electrode insertion groove 303a. Since both the first electrode and the second electrode may be inserted into one support member, the number of the support members may be reduced, and management of the support members may be facilitated.

An intermediate portion 302c may be formed between the first electrode insertion groove 303a and the second electrode insertion groove 303b.

Each of the support members 300 may further include a guide protrusion 304 and a guide groove 305. The guide protrusion 304 and the guide groove 305 may extend along the Z direction from the electrode insertion portion 302. The guide protrusion 304 may be formed to protrude from the upper portion 302a, and the guide groove 305 may be formed to be recessed from the lower portion 302b. However, the disclosure is not limited thereto, and the guide protrusion 304 may protrude from the lower portion 302b, and the guide groove 305 may be recessed from the upper portion 302a.

The guide protrusion 304 and the guide groove 305 may be formed to correspond to each other. The guide protrusion 304 and the guide groove 305 are illustrated in a cylindrical shape, but are not limited thereto, and may include various shapes as long as they allow the support members 300 to be coupled to each other.

When the support members 300 are coupled to each other while in contact with each other due to the guide protrusion 304 and the guide groove 305, the support members may be stably coupled to each other and prevented from being separated from each other.

Figure 10A:
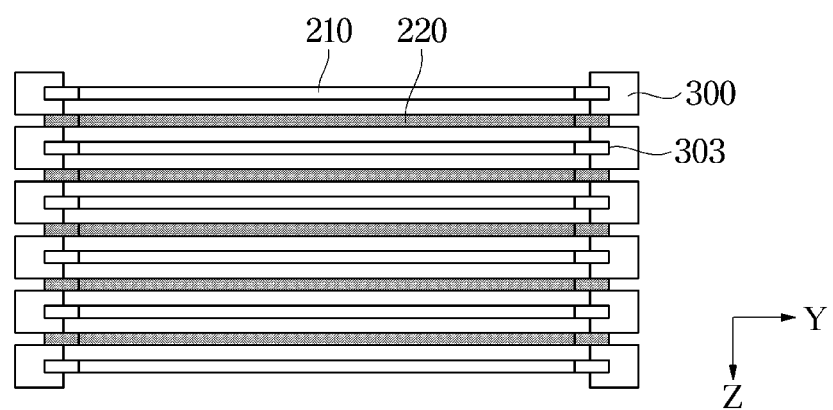
FIG. 10A is a cross sectional view illustrating an electrostatic dust collecting apparatus according to still another embodiment of the disclosure, when viewed in the X direction.
Figure 10B:
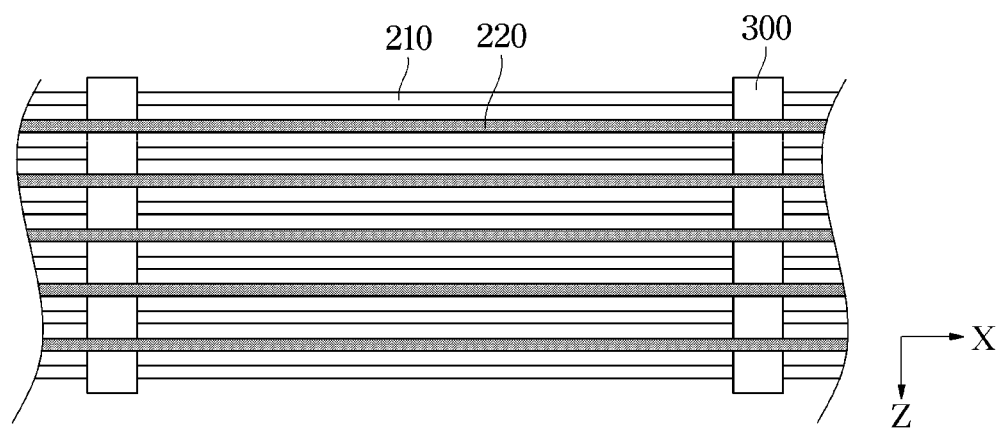
FIG. 10B is a cross sectional view illustrating the electrostatic dust collecting apparatus shown in FIG. 10A, when viewed in the Y direction.

FIG. 10A is a view showing a cross section of an electrostatic dust collecting apparatus according to still another embodiment of the disclosure, when viewed in the X direction. FIG. 10B is a view showing a cross section of the electrostatic dust collecting apparatus shown in FIG. 10A, when viewed in the Y direction.

Referring to FIGS. 10A and 10B, the support member 300 may be coupled to the first electrode 210 and the second electrode 220 may be disposed between the support members 300. That is, the support member 300 may not be coupled to the second electrode 220. However, alternatively, the second electrode 220 may be coupled to the support member, and the first electrode 210 may be disposed between the support members 300.

According to the above-described embodiment, the spacing between electrodes may be maintained with a small number of support members 300, so that the material cost may be reduced.

Air for removing aerosol may pass through a region between the first electrode 210 and the second electrode 220 along the Y direction.

Figure 11:
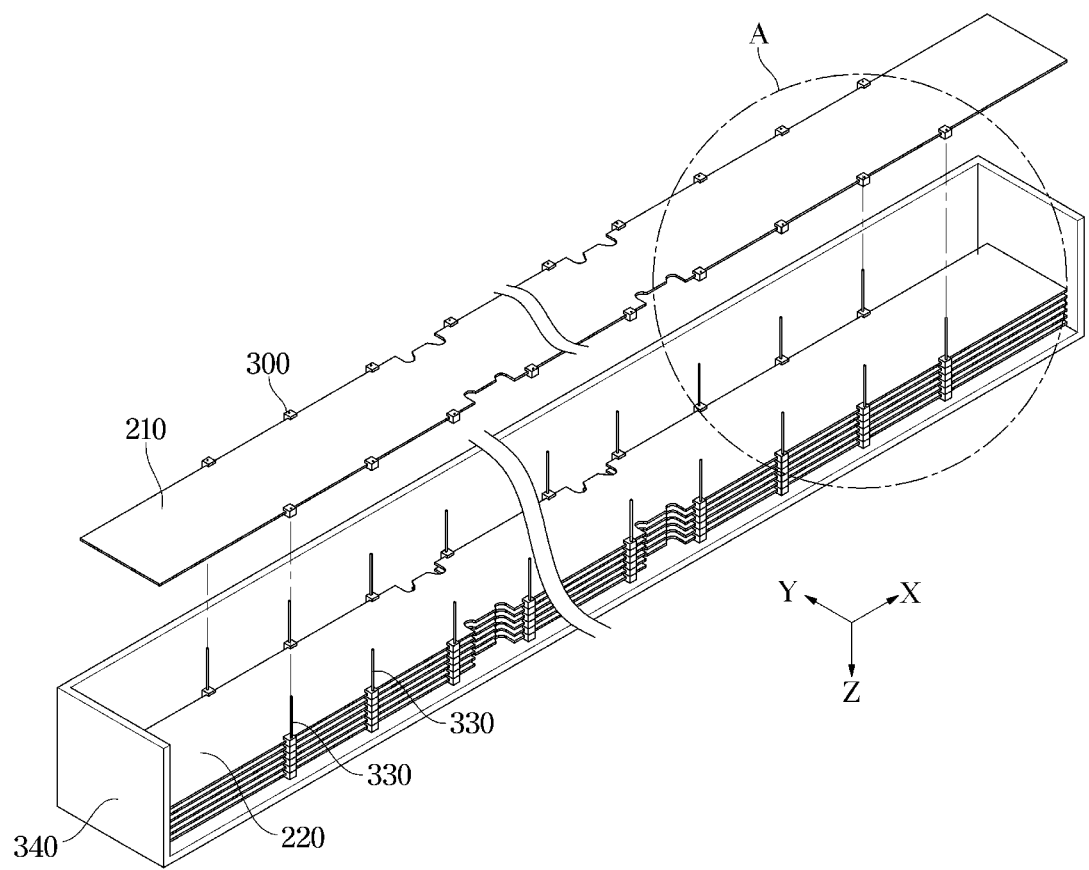
FIG. 11 is a diagram showing a method of manufacturing an electrostatic dust collecting apparatus according to an embodiment of the disclosure.
Figure 12:
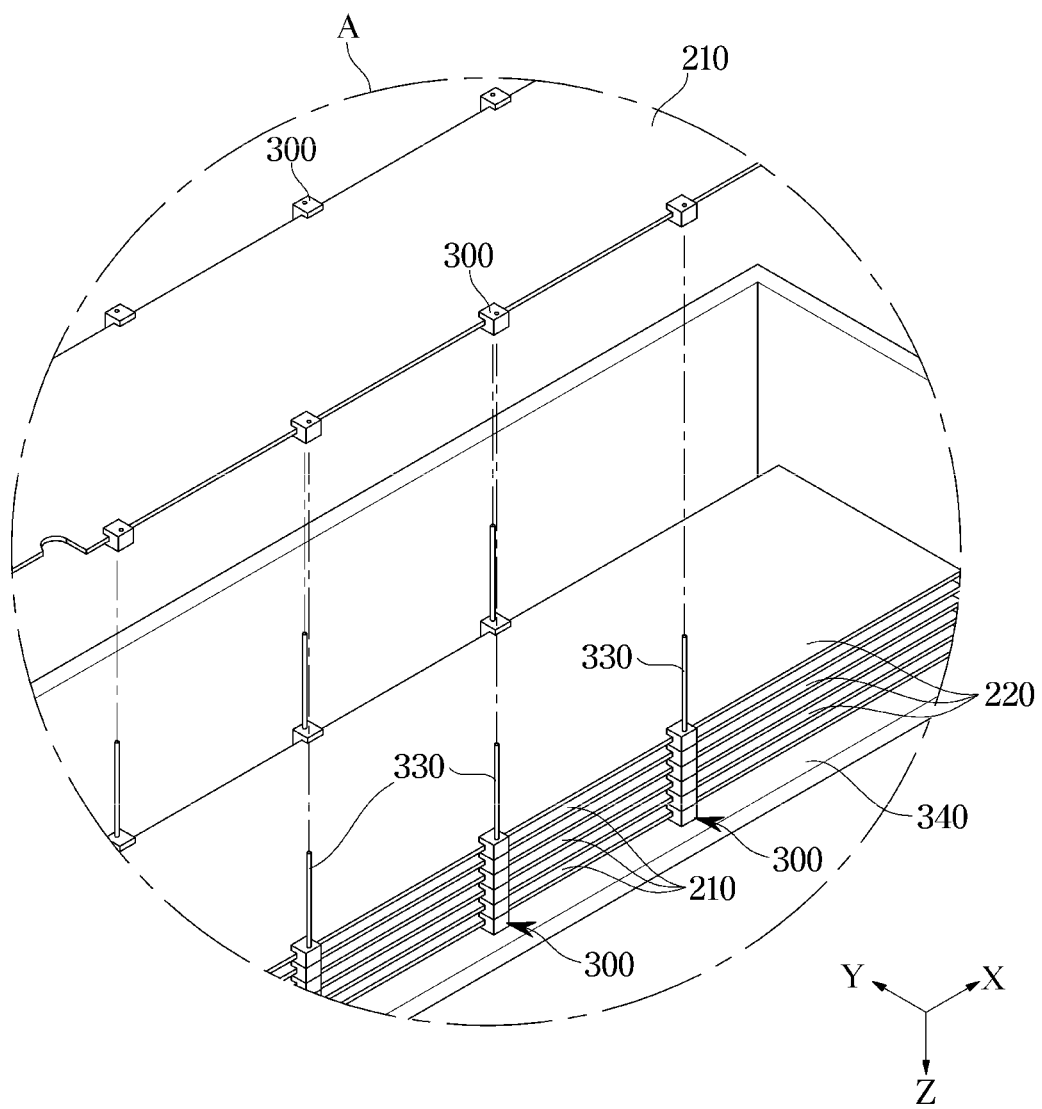
FIG. 12 is an enlarged view of portion A shown in FIG. 11.

FIG. 11 is a diagram showing a method of manufacturing an electrostatic dust collecting apparatus according to an embodiment of the disclosure. FIG. 12 is an enlarged view of portion A shown in FIG. 11.

Referring to FIGS. 11 and 12, the dust collecting unit may be formed by installing the support rod 330 on the dust collecting case 340 and then alternately stacking the first electrodes 210 and the second electrodes 220 one on top of another. In this case, the support members are coupled to the first electrode 210 and the second electrode 220, and the support rod 330 may be coupled to the support members 300 through the coupling holes 301a.

Figure 13:
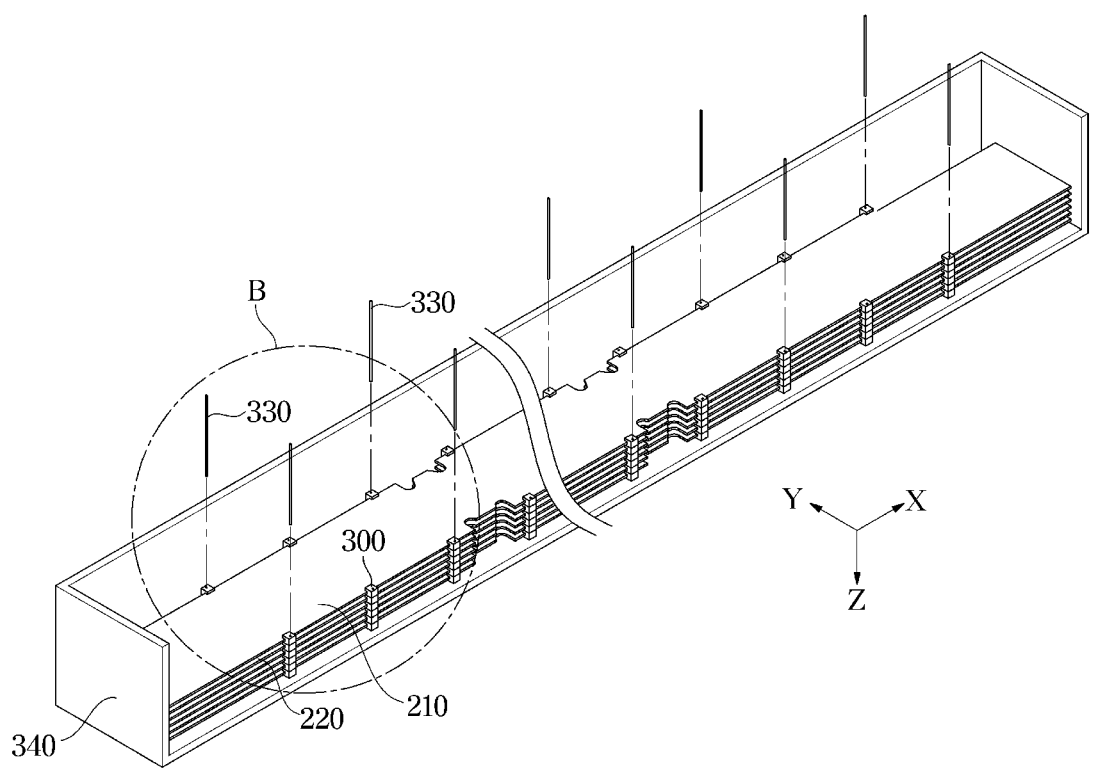
FIG. 13 is a diagram showing a method of manufacturing an electrostatic dust collecting apparatus according to another embodiment of the disclosure.
Figure 14:
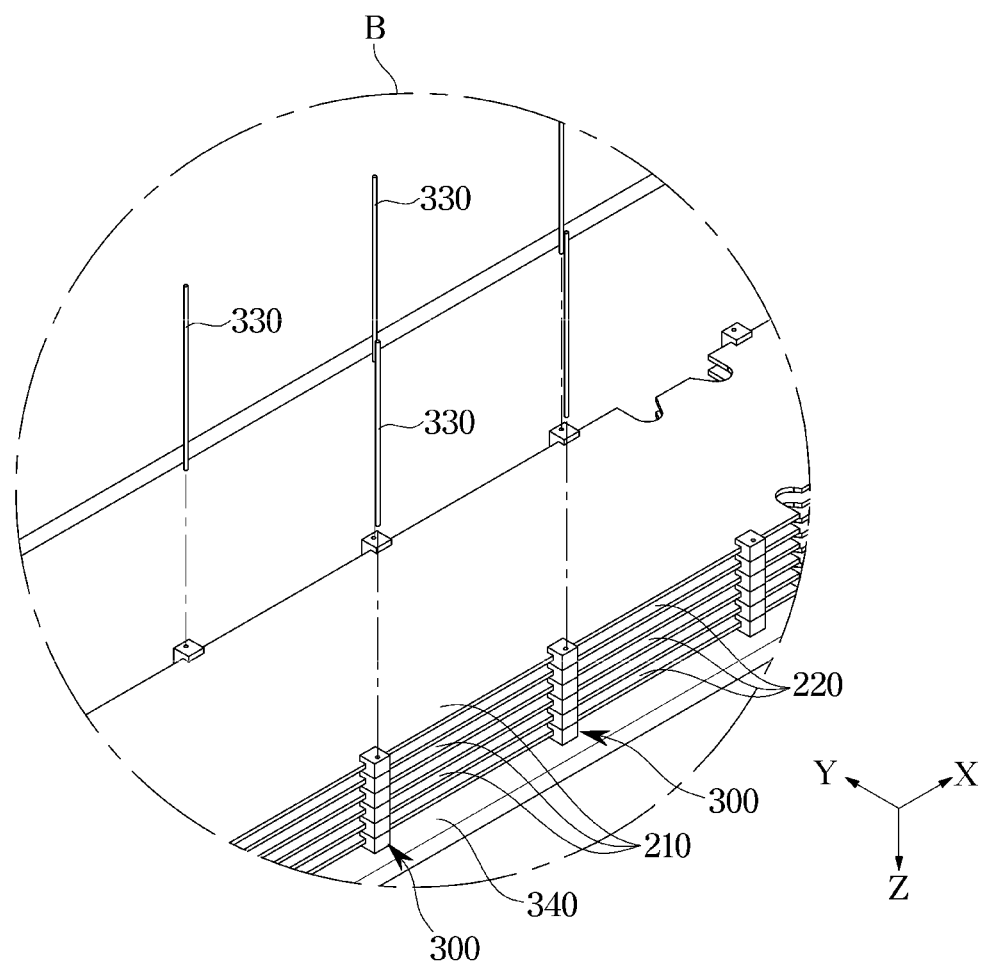
FIG. 14 is an enlarged view of portion B shown in FIG. 13.

FIG. 13 is a diagram showing a method of manufacturing an electrostatic dust collecting apparatus according to another embodiment of the disclosure. FIG. 14 is an enlarged view of portion B shown in FIG. 13.

Referring to FIGS. 13 and 14, the dust collecting unit may be formed by inserting the support rod 330 into the support members 300 that are stacked as the first electrode 210 and the second electrode 220 are alternately on the dust collection case 340.

Figure 15:
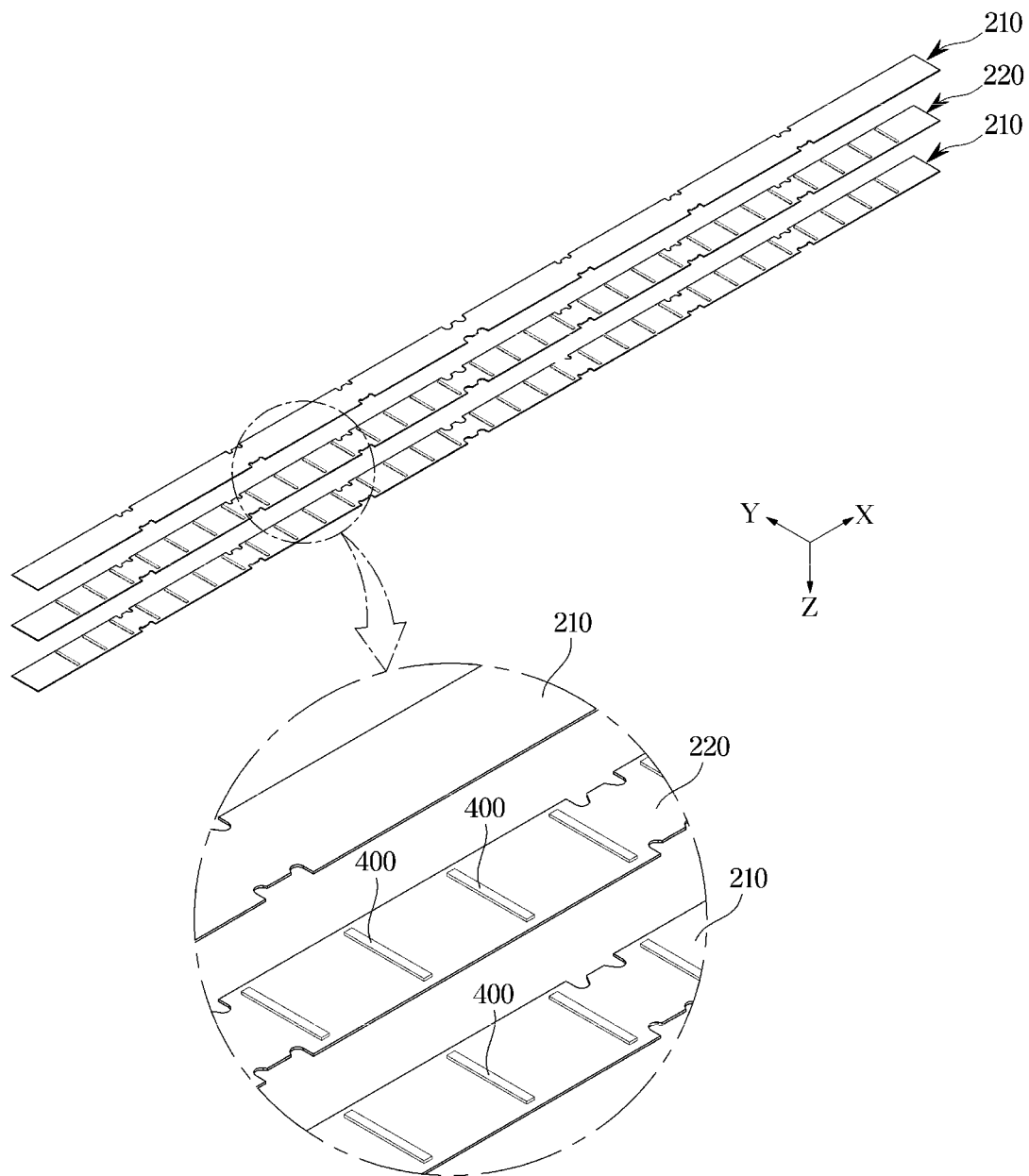
FIG. 15 is a view illustrating an electrostatic dust collecting apparatus according to still another embodiment of the disclosure.
Figure 16A:
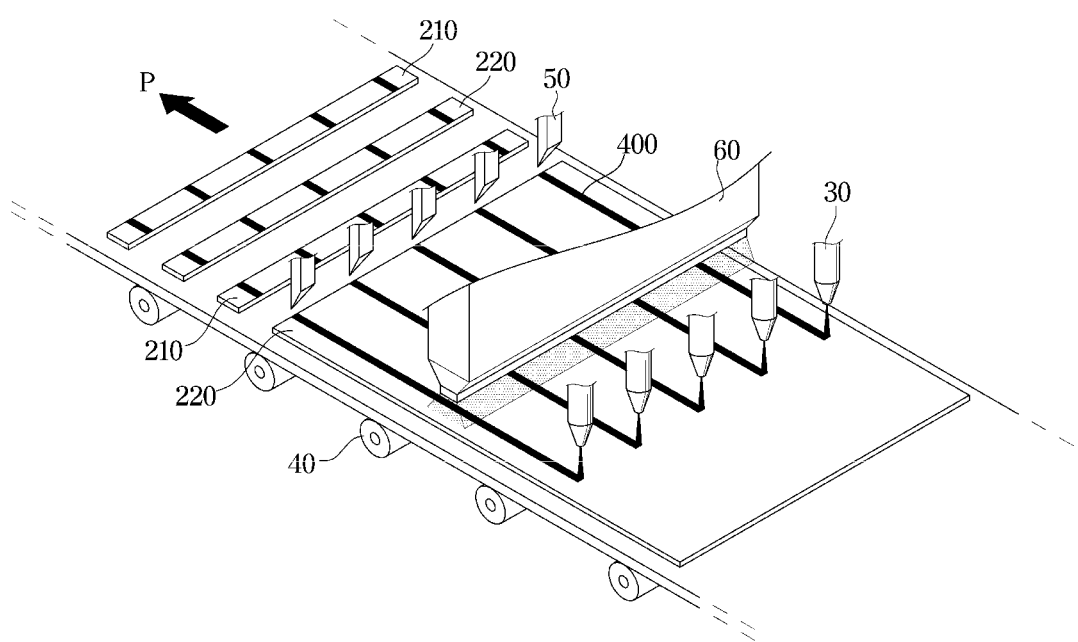
FIG. 16A is a view showing a method of manufacturing an electrostatic dust collecting apparatus according to still another embodiment of the disclosure.
Figure 16B:
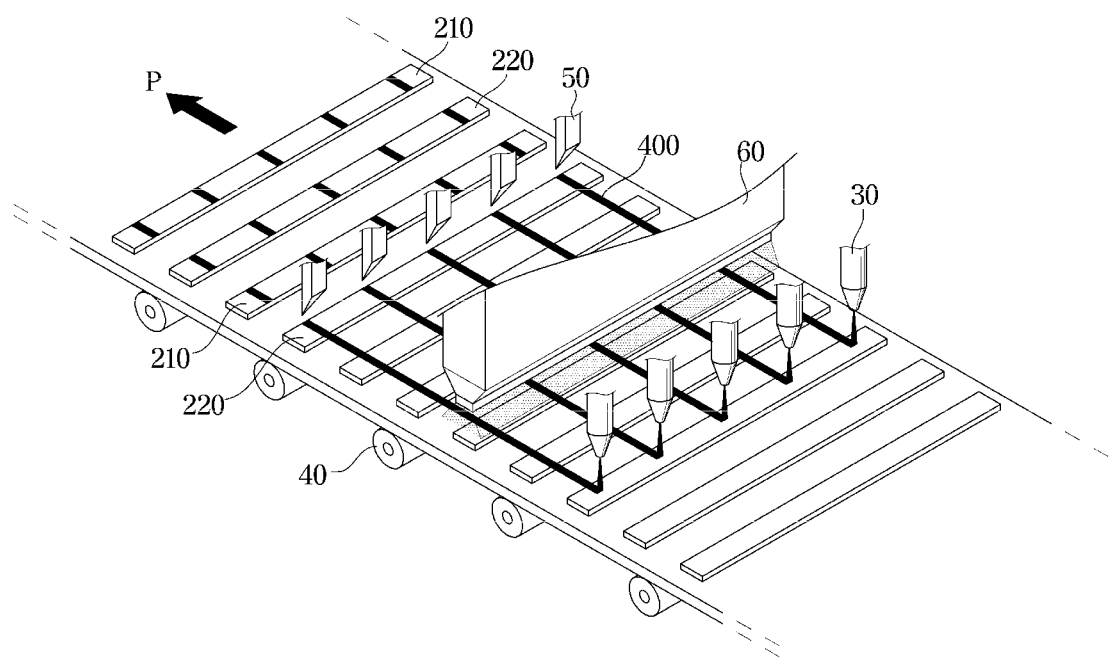
FIG. 16B is a view showing a method of manufacturing an electrostatic dust collecting apparatus according to still another embodiment of the disclosure.

FIG. 15 is a view showing an electrostatic dust collecting apparatus according to still another embodiment of the disclosure. FIG. 16A is a view showing a method of manufacturing an electrostatic dust collecting apparatus according to still another embodiment of the disclosure. FIG. 16B is a view showing a method of manufacturing an electrostatic dust collecting apparatus according to still another embodiment of the disclosure.

Referring to FIGS. 15, 16A, and 16B, the first electrode 210 and the second electrode 220 may have at least one support member 400 disposed therebetween. The support members 400 may be disposed to be spaced apart from each other.

The support member 400 may be formed of a heat-melting adhesive, such as hot melt. While the first electrode 210 and the second electrode 220 is proceeding along a direction P through a transfer roller 40, the hot melt may be applied in a predetermined width and height through a nozzle 30.

Subsequently, the applied hot melt is dried, and the dried support member 400 may be cut. That is, referring to FIG. 16A, the first electrode 210 and the second electrode 220 are continually formed on one electrode fabric, and after the support members 400 are dried, are separately cut into the first electrode 210 and the first electrode 210. Alternatively, referring to FIG. 16B, the electrodes may be supplied in the form of the first electrode 210 and the second electrode 220 cut as separate electrodes and the support members 400 may be applied on the first electrode 210 and the second electrode 220 and cut. The transfer roller 40 may adjust the thickness of the support member 400 by adjusting the transfer speed of the first electrode 210 and the second electrode 220 according to the rotation speed. That is, when the transfer speed is high, the thickness of the support member 400 becomes thinner, and when the transfer speed is low, the thickness of the support member 400 becomes thicker.

Electrodes obtained through the above process may be stacked one on top of another and formed as shown in FIG. 15. The application method is not limited to a spray method by the nozzle 30 and may be implemented in various ways, such as application through a roller (not shown).

Figure 17:
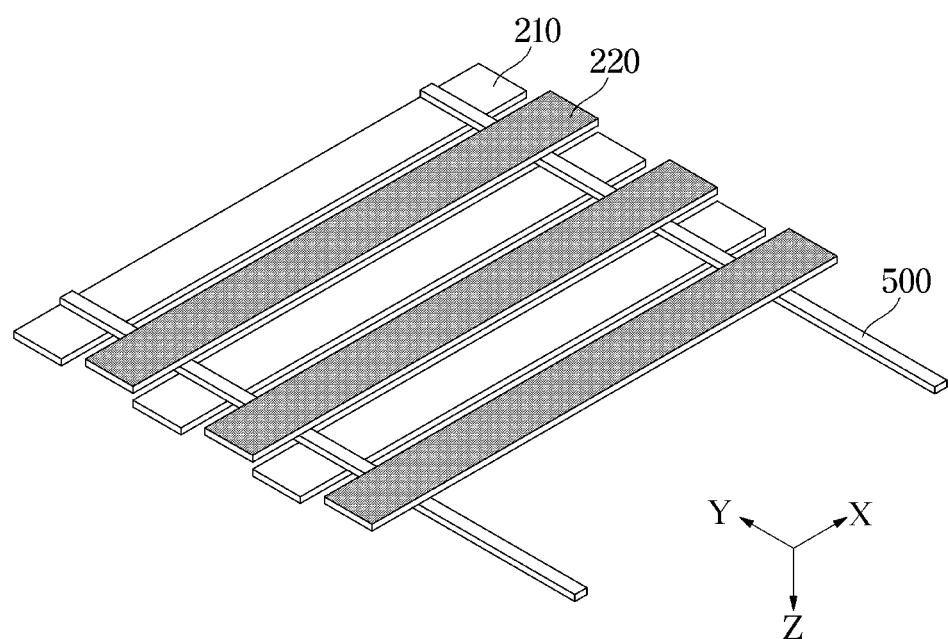
FIG. 17 is a view showing a method of manufacturing an electrostatic dust collecting apparatus according to still another embodiment of the disclosure.
Figure 18:
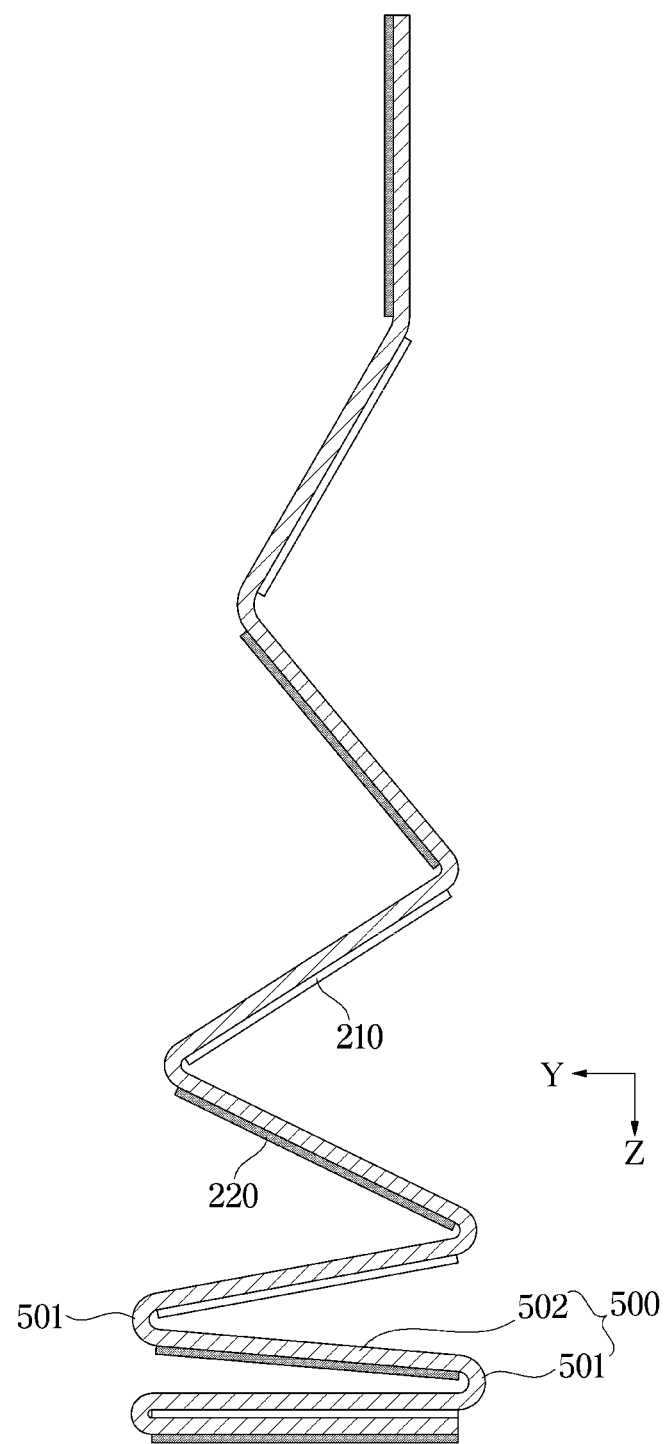
FIG. 18 is a cross-sectional view illustrating a stacking method of the electrostatic dust collecting apparatus shown in FIG. 17, when viewed in the X direction.
Figure 19:
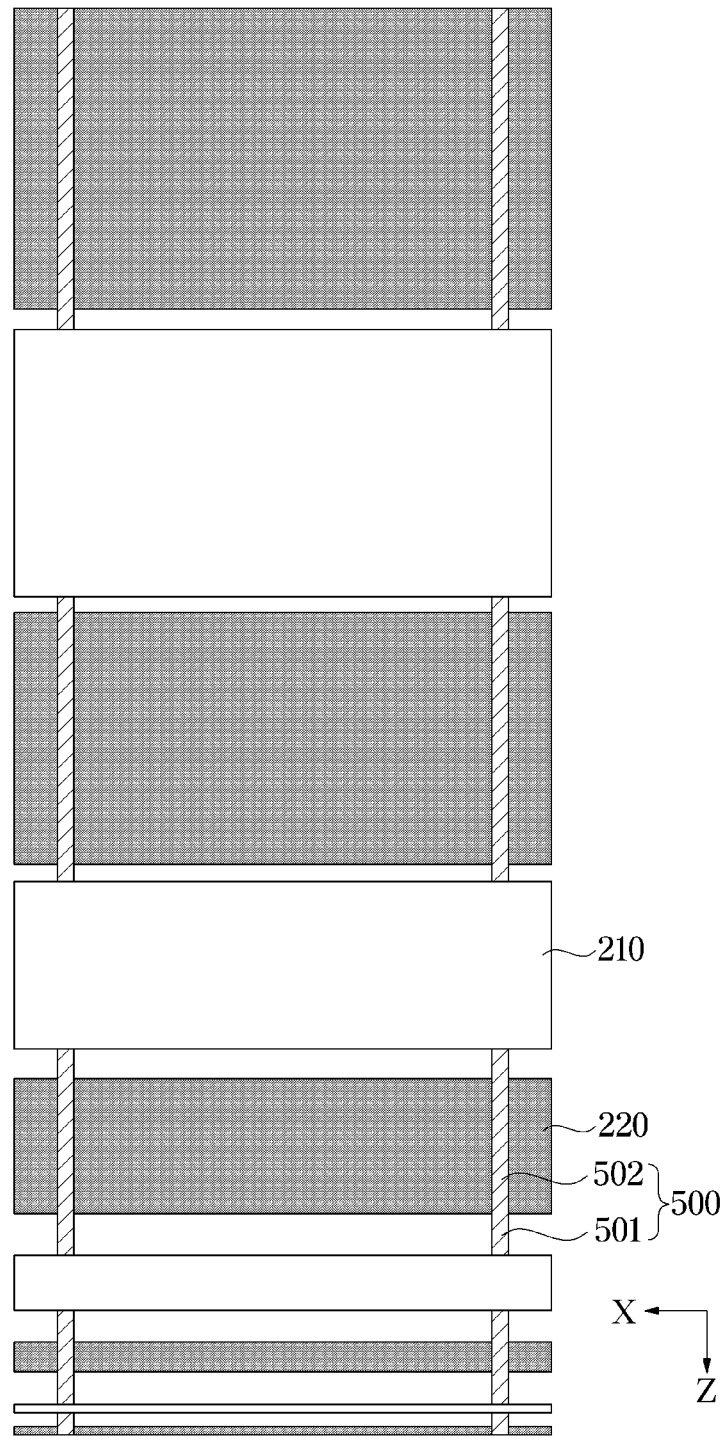
FIG. 19 is a cross-sectional view illustrating a stacking method of the electrostatic dust collecting apparatus shown in FIG. 18, when viewed in the Y direction.

FIG. 17 is a view showing a method of manufacturing an electrostatic dust collecting apparatus according to still another embodiment of the disclosure. FIG. 18 is a cross-sectional view illustrating a stacking method of the electrostatic dust collecting apparatus shown in FIG. 17, when viewed in the X direction. FIG. 19 is a cross-sectional view illustrating a stacking method of the electrostatic dust collecting apparatus shown in FIG. 18, when viewed in the Y direction.

Referring to FIGS. 17 to 19, the first electrode 210 and the second electrode 220 are arranged along the Y direction, and a support member 500 may be disposed between the first electrode 210 and the second electrode 220. The support member 500 may include a bending portion 501 and a connecting portion 502.

The connecting portion 502 may be provided to connect the bending portions 501 provided on opposite sides of the connecting portion 502.

The support member 500 may be formed of a flexible material to be bent. Each of the first electrode 210 and the second electrode 220 may be attached to the support member 500. That is, the first electrode 210 and the second electrode 220 may be disposed on the connecting portions 502 and stacked along the Z direction. Accordingly, the first electrode 210 and the second electrode 220 may be disposed opposite to each other while being spaced apart from each other, and a space for passing air may be provided therebetween. The support member 500 may be attached to surround opposite end portions of each of the first electrode 210 and the second electrode 220 along the short side of the first electrode 210 and the second electrode 220.

In order to directly couple the support member 500 to the electrode, an adhesive member may be attached between the first electrode 210 and the support member 500 and between the second electrode 220 and the support member 500. That is, an adhesive member may be attached between the connecting portion 502 and at least one of the first electrode 210 or the second electrode 220.

The bending portion 501 may be provided in plural. The plurality of bending portion 501 are provided to be spaced apart from each other and may be connected to each other through the connecting portion 502.

Both the first electrode 210 and the second electrode 220 may be attached to the support member 500 that extends. Therefore, a separate process of cutting the support member 500 is not required, so that the manufacturing cost may be reduced.

Air for removing aerosol may pass through a region between the first electrode 210 and the second electrode 220 along the Y direction.

Figure 20:
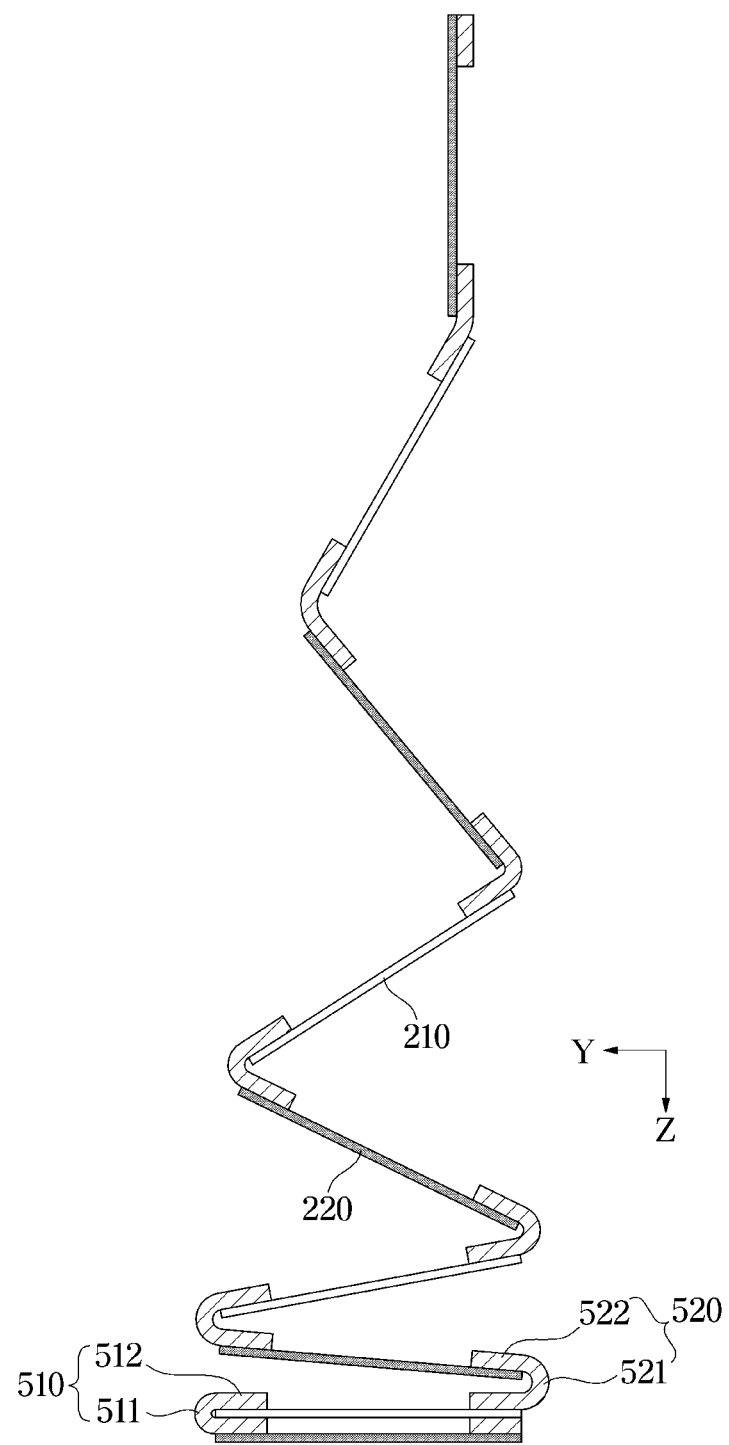
FIG. 20 is a cross-sectional view illustrating a stacking method of an electrostatic dust collecting apparatus according to another embodiment of the disclosure, when viewed in the X direction.
Figure 21:
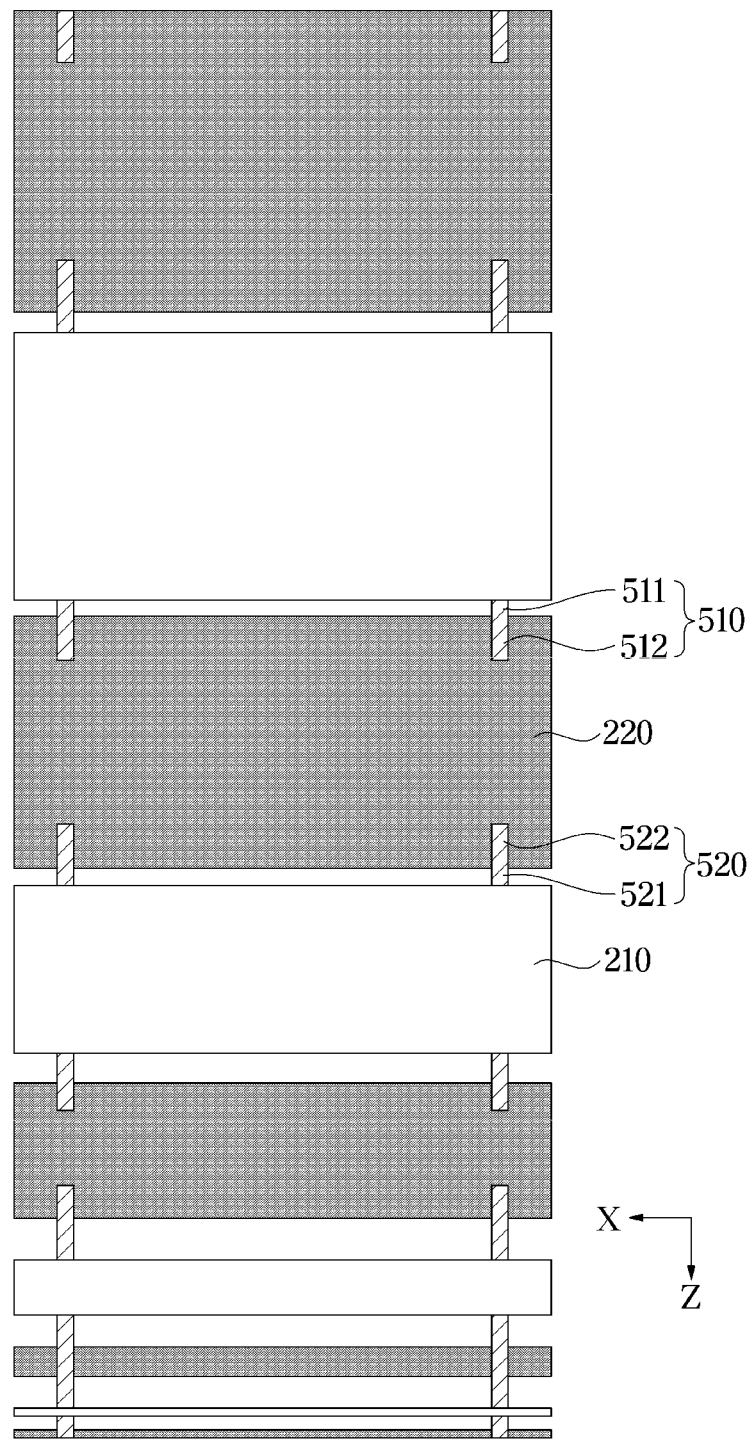
FIG. 21 is a cross-sectional view illustrating a stacking method of the electrostatic dust collecting apparatus shown in FIG. 20, when viewed in the Y direction.

FIG. 20 is a cross-sectional view illustrating a stacking method of an electrostatic dust collecting apparatus according to another embodiment of the disclosure, when viewed in the X direction. FIG. 21 is a cross-sectional view illustrating a stacking method of the electrostatic dust collecting apparatus shown in FIG. 20, when viewed in the Y direction.

Referring to FIGS. 20 and 21, a plurality of support members 500 may be provided. The support member 500 may include a first support member 510 and a second support member 520. The first support member 510 may include a bending portion 511 and a connecting portion 512, and the second support member 520 may also include a bending portion 521 and a connecting portion 522.

The support members 500 may be attached to opposite end portions of each of the first electrode 210 and the second electrode 220 along the short side of the first electrode 210 and the second electrode 220. The support members 500 may be attached to surround the opposite end portions. The connecting portions 512, 522 are attached to the first electrode 210 and the second electrode 220, and allow the bending portion 511, 521 to be connected to the electrodes. The bending portion 511, 521 and the connecting portion 512, 522 may allow the first electrode 210 and the second electrode 220 to face each other while maintaining an interval between the first electrode 210 and the second electrode 220.

The first support member 510 and the second support member 520 may be disposed to be spaced apart from each other. At opposite end portions along the short side of the electrode, the first support member 510 may be attached to one end portion of the first electrode 210, and the second support member 520 may be attached to one end portion of the second electrode 220. Accordingly, the first support member 510 may be formed to surround the first electrode 210, and the second support member 52 may be formed to surround the second electrode 220.

The first support member 510 and the second support member 520 may allow the first electrode 210 and the second electrode 220 to face each other while maintaining an interval between the first electrode 210 and the second electrode 220.

Air for removing aerosol may pass through a region between the first electrode 210 and the second electrode 220 along the Y direction.

As is apparent from the above, a support member having a simple shape can sufficiently secure an interval between a high voltage electrode and a low voltage electrode, and reduce leakage of current between the electrodes.

Use of the support member having a simple shape reduces the output of a power supply device, so that the operating cost of the electrostatic dust collecting apparatus can be reduced.

The electrostatic dust collecting apparatus can be manufactured in a simplified manufacturing process and at reduced manufacturing cost.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

What is claimed is:

1. An electrostatic dust collecting apparatus comprising:
a first electrode;
a second electrode spaced apart from the first electrode along a direction;
a plurality of support members spacing apart the first electrode and the second electrode; and
a support bar extending longitudinally along the direction, wherein
each support member among the plurality of support members includes at least one electrode insertion groove in which the first electrode or the second electrode is inserted, and a coupling hole through which the support bar extends in the direction,
each support member among the plurality of support members is a single body of insulating material, and
the plurality of support members are stacked in the direction so that each support member among the plurality of support members contacts an adjacent support member among the plurality of support members.

2. The electrostatic dust collecting apparatus of claim 1, wherein
each support member among the plurality of support members includes:
a body, and
an electrode insertion portion,
the coupling hole extends through the body in the direction, and
the at least one electrode insertion groove is on the electrode insertion portion.

3. The electrostatic dust collecting apparatus of claim 2, wherein
the plurality of support members includes:
a first support member into which the first electrode is inserted, and
a second support member into which the second electrode is inserted, and
the first support member and the second support member are stacked in the direction in contact with each other.

4. The electrostatic dust collecting apparatus of claim 1, wherein
a plurality of support members among the plurality of support members respectively surround opposite end portions of the first electrode or the second electrode.

5. The electrostatic dust collecting apparatus of claim 2, wherein
each support member among the plurality of support members includes:
a guide protrusion protruding from the electrode insertion portion along the direction, and a guide groove corresponding to the guide protrusion and recessed into the electrode insertion portion along the direction.

6. The electrostatic dust collecting apparatus of claim 5, wherein
the guide protrusion protrudes from an upper portion of the electrode insertion portion, and
the guide groove is recessed into a lower portion of the electrode insertion portion.

7. The electrostatic dust collecting apparatus of claim 5, wherein
the plurality of support members includes:
a first support member into which the first electrode is inserted, and
a second support member into which the second electrode is inserted, and
the guide groove of the first support member and the guide protrusion of the second support member are coupled to each other.

8. The electrostatic dust collecting apparatus of claim 1, further comprising:
a plurality of first electrodes; and
a plurality of second electrodes,
wherein at least one support member among the plurality of support members includes:
a first electrode insertion groove into which one first electrode among the plurality of first electrodes is inserted, and
a second electrode insertion groove into which one second electrode among the plurality of second electrodes is inserted, the second electrode insertion groove spaced apart from the first electrode insertion groove.

9. The electrostatic dust collecting apparatus of claim 2, wherein
each support member among the plurality of support members includes a fixing device configured to fix the first electrode or the second electrode in the at least one electrode insertion groove.

10. The electrostatic dust collecting apparatus of claim 9, wherein
the fixing device includes at least one of a hook protruding toward the at least one electrode insertion groove and an adhesive member.

11. The electrostatic dust collecting apparatus of claim 10, wherein the hook protrudes from an upper portion of the electrode insertion portion.

12. The electrostatic dust collecting apparatus of claim 1, wherein the first electrode is a high voltage electrode, and the second electrode is a low voltage electrode.

13. An electrostatic dust collecting apparatus comprising:
a first electrode;
a second electrode to be spaced apart from the first electrode along a direction;
at least one support member configured to space apart the first electrode and the second electrode from each other; and
a support bar formed to extend along the direction,
wherein each of the at least one support member includes at least one electrode insertion groove formed to allow at least one of the first electrode or the second electrode to be inserted and a coupling hole formed along the direction to allow the support bar to be inserted,
wherein each of the at least one support member includes a body and an electrode insertion portion,
wherein the coupling hole is formed on the body and the at least one electrode insertion groove is formed on the electrode insertion portion, and
wherein each of the at least one support member includes a guide protrusion formed to protrude from the electrode insertion portion along the direction and a guide groove formed to correspond to the guide protrusion.

14. The electrostatic dust collecting apparatus of claim 13, wherein the guide protrusion protrudes from an upper portion of the electrode insertion portion, and the guide groove is recessed from a lower portion of the electrode insertion portion.

15. The electrostatic dust collecting apparatus of claim 13, wherein the at least one support member is a first support member into which the first electrode is inserted and the at least one support member includes a second support member into which the second electrode is inserted, and
wherein the guide groove of the first support member and the guide protrusion of the second support member are coupled to each other.

16. An electrostatic dust collecting apparatus comprising:
a first electrode;
a second electrode to be spaced apart from the first electrode along a direction;
at least one support member configured to space apart the first electrode and the second electrode from each other; and
a support bar formed to extend along the direction,
wherein each of the at least one support member includes at least one electrode insertion groove formed to allow at least one of the first electrode or the second electrode to be inserted and a coupling hole formed along the direction to allow the support bar to be inserted,
wherein each of the at least one support member includes a body and an electrode insertion portion,
wherein the coupling hole is formed on the body and the at least one electrode insertion groove is formed on the electrode insertion portion, and
wherein the at least one support member includes a fixing device configured to fix at least one of the first electrode or the second electrode.

17. The electrostatic dust collecting apparatus of claim 16, wherein the fixing device includes at least one of a hook protruding toward the at least one electrode insertion groove or an adhesive member.

18. The electrostatic dust collecting apparatus of claim 17, wherein the hook protrudes from an upper portion of the electrode insertion portion.

* * * * *